(12) United States Patent
Yoshioka

(10) Patent No.: US 7,652,741 B2
(45) Date of Patent: Jan. 26, 2010

(54) ACTIVE MATRIX SUBSTRATE AND A LIQUID CRYSTAL DISPLAY DEVICE INCLUDING THE ACTIVE MATRIX SUBSTRATE

(75) Inventor: Kenji Yoshioka, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 543 days.

(21) Appl. No.: 11/541,662

(22) Filed: Oct. 3, 2006

(65) Prior Publication Data

US 2007/0085962 A1    Apr. 19, 2007

(30) Foreign Application Priority Data

Oct. 14, 2005    (JP) .............................. 2005-299856

(51) Int. Cl.
G02F 1/1345    (2006.01)
(52) U.S. Cl. ....................... 349/149; 349/152
(58) Field of Classification Search ................. 349/139, 349/152
See application file for complete search history.

(56) References Cited

U.S. PATENT DOCUMENTS 6,190,934 B1 * 2/2001 Kang et al. .................... 438/30
6,977,708 B2 * 12/2005 Tanaka et al. ............... 349/152
7,230,668 B2 * 6/2007 Lee et al. .................... 349/152
2004/0239857 A1    12/2004 Yoshikawa

FOREIGN PATENT DOCUMENTS

CN    1615451 A    5/2005

* cited by examiner

Primary Examiner—Uyen-Chau N Le
Assistant Examiner—Hoang Tran
(74) Attorney, Agent, or Firm—Young & Thompson

(57) ABSTRACT

Disclosed is an active matrix substrate which includes a display area and a terminal area located outside the display area. The terminal area includes extraction wirings connected with signal lines and scanning lines of the display area. A testing terminal for making contact with a probe of a prober and a connection terminal on which a chip is mounted are provided on each of the extraction wirings. The terminals are connected with the extraction wirings through contact holes. Even when an area of the testing terminal is larger than an area of the connection terminal, an opening area of a second contact hole for the testing terminal is reduced to an area smaller than an opening area of a first contact hole for the connection terminal.

20 Claims, 11 Drawing Sheets

PERIPHERAL AREA OF TFT SUBSTRATE

- COUNTER SUBSTRATE OUTLINE
- 7a EXTRACTION WIRING
- 5 COG PRESS PORTION
- 7b CONNECTION WIRING
- 6a COG PRESS TERMINAL
- TFT SUBSTRATE OUTLINE
- 6 COF

TERMINAL ARRANGEMENT PORTION

ACTIVE MATRIX SUBSTRATE AND A LIQUID CRYSTAL DISPLAY DEVICE INCLUDING THE ACTIVE MATRIX SUBSTRATE

BACKGROUND OF THE INVENTION

1. Field of the Invention

The present invention relates to an active matrix substrate and a liquid crystal display device, and more particularly, to a structure of a terminal area located outside a display area of an active matrix substrate and a liquid crystal display device including the active matrix substrate.

2. Description of the Related Art

Liquid crystal display devices have advantages such as a thin thickness, a lightweight, and low power consumption and have been widely used as display devices of audio/video (AV) devices, Office Automation (OA) devices, and other such devices. A liquid crystal display device has a structure in which a liquid crystal layer is sandwiched between an active matrix substrate and a counter substrate. The active matrix substrate is a substrate on which thin film transistors (TFTs) and pixel electrodes are formed. The counter substrate is a substrate in which color filters, a black matrix, and the like are formed. The liquid crystal display device displays information by controlling orientation directions of liquid crystal molecules with electric fields generated by electrodes provided on at least one of the substrates. Hereinafter, the active matrix substrate is also referred to as a "TFT substrate".

As shown in FIG. 8, a TFT substrate 2 includes a display area 4a in which a plurality of scanning lines 12 and a plurality of signal lines 11 are formed. The scanning lines 12 are substantially orthogonal to the signal lines 11. Each area surrounded by adjacent two of the scanning lines 12 and adjacent two of the signal lines 11 includes a pixel electrode 13 and a TFT 14 which are formed thereon. Each TFT is connected with one of the scanning lines and one of the signal lines. The scanning lines 12 and the signal lines 11 are connected with extraction wirings 7a formed on a terminal area 4c (located outside the display area 4a). A connection terminal 8a on which a chip-on-glass (COG) chip is mounted and a testing terminal 9 for making contact with a probe of a prober are provided on each of the extraction wirings 7a.

FIGS. 9A and 9B are schematic views showing a structure which includes an extraction wiring and a connection terminal and a testing terminal which are formed thereon. FIG. 9A is a plan view and FIG. 9B is a cross sectional view taken along an X-X line shown in FIG. 9A. In the case of a reverse stagger liquid crystal display device, as shown in FIGS. 9A and 9B, a metallic film 16 serving as the extraction wiring is formed on a transparent insulator substrate 15. The metallic film 16 is covered with an insulator film 17. The insulator film 17 includes a first contact hole 10a formed in a position corresponding to the connection terminal 8a and a second contact hole 10b formed in a position corresponding to the testing terminal 9. The connection terminal 8a and the testing terminal 9 which are made of, for example, an indium tin oxide (ITO) film 18 are formed in the positions in which the contact holes are formed.

The above-mentioned terminal structure is disclosed in US 2004/0239857 A1 (reference-1). For example, the reference-1 discloses that rectangular-shaped contact holes are provided in rectangular-shaped terminals as shown in FIGS. 9A and 9B.

The TFT substrate 2 is bonded to a counter substrate 3 by a seal member provided around the display area 4a and a liquid crystal layer is enclosed between the substrates. As a result, the display area 4a of the TFT substrate 2 is not influenced by external environments. However, the terminal area 4c located outside the display area 4a is exposed to an outside as a matter of convenience of COG chip mounting and operation check using a prober. Therefore, respective constituent, members of the terminal area 4c, that is, the connection terminal 8a, the testing terminal 9, the extraction wiring 7a, and the like may be easily influenced by the external environments. The influence of the external environments on the connection terminal 8a is relatively small because the connection terminal 8a is covered with a bump by chip mounting. On the other hand, the testing terminal 9 is easily influenced by the external environments because the testing terminal 9 is being exposed even after chip mounting.

As shown in FIG. 9B, the insulator film 17 is formed on the metallic film 16 serving as the extraction wiring 7a. The first contact hole 10a and the second contact hole 10b which are provided in the insulator film 17 are filled with the ITO film 18. The ITO film 18 serves as the connection terminal 8a and the testing terminal 9. Therefore, at first glance, it appears that the metallic film 16 is not exposed in the structure shown in FIG. 9B. However, a portion of the metallic film 16 which is exposed may be actually caused near the opening ends of the first contact hole 10a and the second contact hole 10b. As a result, the metallic film 16 may be exposed to external air and corroded.

This cause will be described with reference to FIGS. 10A, 10B, 10C, 11A, and 11B. FIGS. 10A, 10B, and 10C are sectional views showing steps of producing the terminal area 4c. FIGS. 11A and 11B are enlarged views showing a region surrounded by a broken circle 31 shown in FIG. 10C.

Steps of producing the terminal area 4c will be briefly described. First, the metallic film 16 is formed on the transparent insulator substrate 15 made of glass, plastic, or the like (FIG. 10A). The metallic film 16 is patterned to form the extraction wirings 7a together with the scanning lines and the signal lines.

Next, the insulator film 17 made of silicon oxide, silicon nitride, or the like is formed. A mask pattern is formed on the insulator film 17. Exposed potions of the insulator film 17 are etched by a wet etching method or a dry etching method to form the first contact hole 10a and the second contact hole 10b (FIG. 10B).

Next, the ITO film 18 is formed. The ITO film 18 is patterned to form the connection terminal 8a covering the first contact hole 10a and the testing terminal 9 covering the second contact hole 10b (FIG. 10C).

At this time, when the ITO film 18 is deposited in the first contact hole 10a and the second contact hole 10b by a physical method such as a sputtering method, a gap 19a in which the ITO film 18 is not deposited may be caused near the opening ends of the contact holes as shown in FIG. 11A. This is because a side wall of the first contact hole 10a and a side wall of the second contact hole 10b are substantially vertically formed.

As shown in FIG. 11B, when the contact between the ITO film 18 and the insulator film 17 is poor, a gap 19b may be caused between the ITO film 18 and the, insulator film 17. In particular, an area of the testing terminal 9 is larger than an area of the connection terminal 8a, so an area of the second contact hole 10b becomes larger than an area of the first contact hole 10a. Therefore, a circumference of the second contact hole 10b becomes longer than a circumference of the first contact hole 10a, so that it is more likely to cause the gap 19b with the testing terminal 9 than to cause the gap 19b with the connection terminal 8a.

When moisture or the like which is included in external air penetrates from the gap 19a or 19b, the metallic film 16 of the extraction wiring 7a is corroded. In particular, when the metallic film 16 is made of base metal such as Al, the corrosion proceeds by battery reaction or the like. As a result, a resistance value between the extraction wiring 7a and the connection terminal 8a and a resistance value between the extraction wiring 7a and the testing terminal 9 increase. At worst, it is likely to break the extraction wiring. This phenomenon reduces the reliability of the liquid crystal display device and shortens the life thereof.

In addition, the reference-1 describes that another metallic film is formed between the metallic film of the lower layer and the ITO film of the upper layer to suppress the exposure of the metallic film of the lower layer. However, this method complicates a manufacturing process and thus hinders a reduction in price of the liquid crystal display device.

SUMMARY OF THE INVENTION

A first exemplary feature of the invention provides an active matrix substrate in which the corrosion of extraction wirings in a terminal area located outside a display area on the substrate is suppressed and a liquid crystal display device including the active matrix substrate.

According to a first exemplary aspect of the invention, there is provided an active matrix substrate. The active matrix substrate includes a display area and a terminal area provided outside the display area.

First wirings and second wirings which are substantially orthogonal to one another are formed in the display area. A small area surrounded by adjacent two of the first wirings and adjacent two of the second wirings includes a pixel electrode and a switching device which are formed thereon. Pixels are arranged corresponding to small areas.

The terminal area includes a plurality of extraction wirings connected with the first wirings and the second wirings, a first terminal which is provided above each of the extraction wirings through an insulator film to connect an extraction wiring with a chip mounted on the terminal area, a second terminal which is provided above each of the extraction wirings through the insulator film to bring the extraction wiring into contact with a probe of a prober, a first contact hole which is provided in the insulator film to connect the extraction wiring with the first terminal, and a second contact hole which is provided in the insulator film to connect the extraction wiring with the second terminal.

Even when the second terminal has an area larger than the first terminal, an opening area of the second contact hole is smaller than an opening area of the first contact hole.

According to the present invention, a size relationship is specified between the opening area of the first contact hole for connecting the extraction wiring with the connection terminal and the opening area of the second contact hole for connecting the extraction wiring with the testing terminal, which are formed in the terminal area located outside the display area on the active matrix substrate. Therefore, there is provided an active matrix substrate in which the corrosion of the extraction wiring resulting from the presence of a gap caused near an opening end of a contact hole is effectively suppressed to obtain high reliability.

As will be described later with reference to experimental results, when the opening area of the second contact hole is reduced to an area smaller than the opening area of the first contact hole, the extraction wiring can be effectively prevented from exposing in the vicinity of the opening end of the second contact hole.

BRIEF DESCRIPTION OF THE DRAWINGS

The above and other objects, features, and advantages of the present invention will become apparent from the following detailed description when taken with the accompanying drawings in which.

DETAILED DESCRIPTION OF THE PREFERRED EMBODIMENTS

Figure 1:
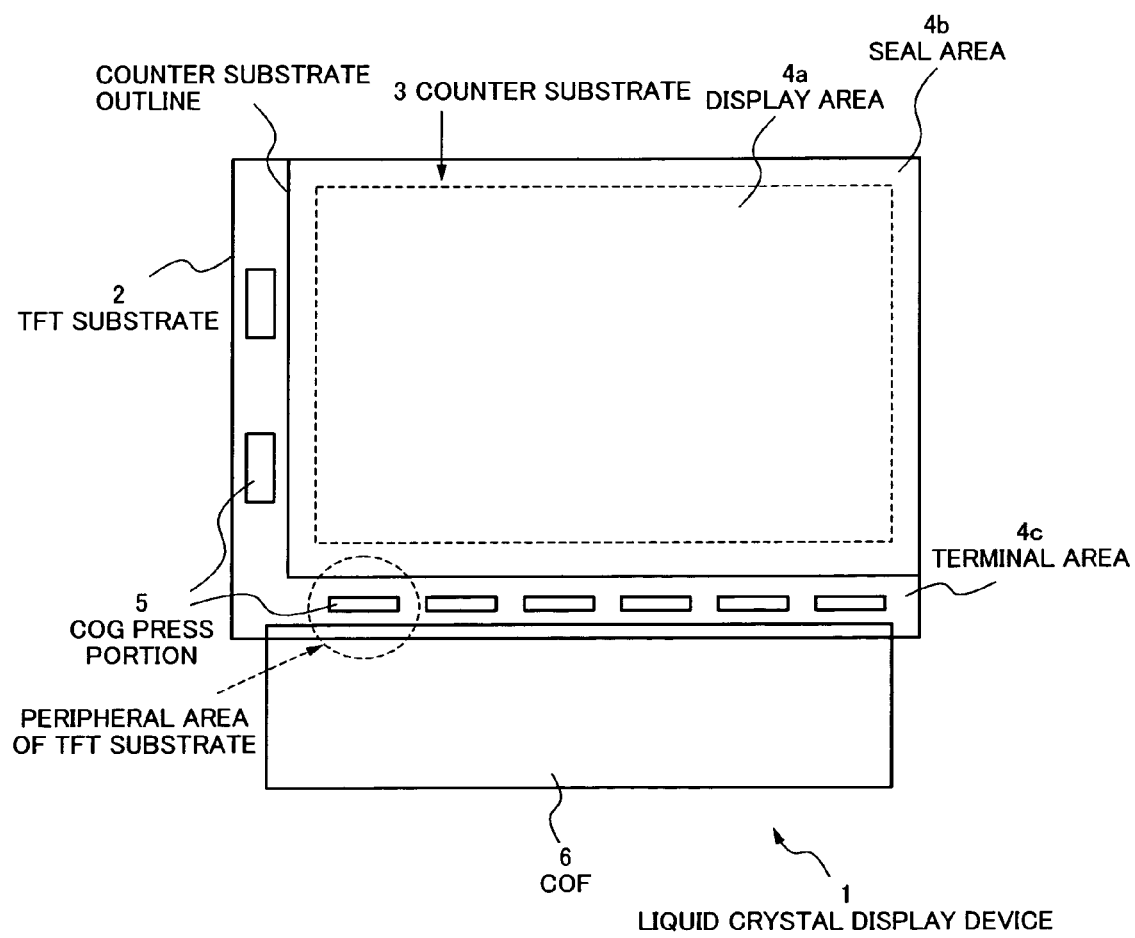
FIG. 1 is a schematic plan view showing a structure of a liquid crystal display device according to an exemplary embodiment of the present invention.

First, preferred aspects of the present invention will be briefly described.

As described in "BACKGROUND OF THE INVENTION", in the related arts, the extraction wirings which are connected with the scanning lines and the signal lines are formed in a peripheral region of the TFT substrate, that is, the terminal area 4c. The connection terminals and the testing terminals (in particular, the testing terminals) are exposed in the environment. Therefore, when a gap is caused near the opening end of a contact hole, a corresponding extraction wiring is exposed. As a result, there is the case where the extraction wiring is corroded to cause an increase in resistance of the extraction wiring or a break in the extraction wiring.

Possible solutions for this problem include a method of widening the width of the extraction wiring. However, in order to realize high-definition display, a pixel size of the liquid crystal display device of recent years has been made smaller, thereby increasing the number of extraction wirings. Therefore, when the high-definition display is required for the display device, the method of widening the width of the extraction wiring is difficult to be employed.

A method of widening a terminal interval between the connection terminal and the testing terminal or increasing a terminal size of the connection terminal or the testing terminal can also be considered. However, these methods to solve the above-mentioned problem causes an increase in size of the terminal area of the TFT substrate. It is required that the width of a frame portion of the liquid crystal display device of recent years be narrowed. When the terminal area, which does not contribute the displaying function directly, expands, the width of the frame portion widens. Therefore, the method of widening the terminal interval or increasing the terminal size cannot be employed for narrowing the width of the frame portion of the display device.

The details of the exemplary embodiments will be understood by the skilled person from the above-mentioned description and thus any further description is omitted here.

According to another aspect of the present invention, the inventor of the present invention focuses on the point that the testing terminal is more influenced than the connection terminal by corrosion. An opening area of the second contact hole for the testing terminal is specified to become smaller than an opening area of the first contact hole for the connection terminal even when the area of the testing terminal for making contact with a probe of a prober is larger than the area of the connection terminal on which a COG chip is mounted. As a result, the generation of a gap near the opening end of the second contact hole is suppressed.

A lower limit of the area of the second contact hole or a lower limit of an area ratio of the second contact hole to the testing terminal is preferably specified. That is, the lower limit of the area ratio is specified based on a resistance value between the extraction wiring and the testing terminal to suppress an increase in contact resistance.

It is also preferable that a lower limit of the area of the first contact hole be specified based on a cross sectional area of a bump on a chip in a radius direction thereof to certainly protect the first contact hole.

It is also preferable to form at least an opening portion of the second contact hole in a shape such that the area thereof is equal to that in the case of a rectangular shape and a circumference length thereof becomes shorter than that in the case of the rectangular shape, to reduce the probability of generation of the gap near the opening end of the second contact hole.

It is also preferable to locate the second contact hole in a position away from a contact area with a probe of a prober. This suppresses the generation and the expansion of the gap resulting from the contact with the probe.

When at least one of the above-mentioned manners is employed, it is unnecessary to widen the width of the extraction wiring, increase the terminal interval or the terminal size, or complicate a manufacturing method. Therefore, the corrosion of the extraction wiring in the terminal area is effectively prevented using a simple structure to improve the reliability of the liquid crystal display device.

Next, further detail of exemplary embodiments of the present invention will be described with reference to FIGS. 1 to 7D.

A liquid crystal display device 1 according to an exemplary embodiment of the present invention is composed of a liquid crystal panel, a back light unit (not shown), a box (not shown), and the like. As shown in FIG. 1, the liquid crystal panel includes an active matrix substrate (hereinafter referred to as a "TFT substrate 2") in which switching devices such as TFTs are formed, a counter substrate 3 in which color filters, a black matrix, and the like are formed, and a liquid crystal layer sandwiched between the TFT substrate 2 and the counter substrate 3.

The TFT substrate 2 includes a display area 4a, a seal area 4b, and a terminal area 4c. In the display area 4a, pixels are formed in small regions separated by scanning lines (which are also called "gate lines") and signal lines (which are also called "drain lines") which extend substantially orthogonal to each other. The pixels are arranged in matrix. The seal area 4b is provided in a peripheral portion of the display area 4a. A sealing material for holding and fixing the counter substrate 3 and sealing the liquid crystal layer is applied to or drawn on the seal area 4b. The terminal area 4c is provided outside the seal area 4b. The terminal area 4c includes an area for making connection with COG press portions 5 and a flexible substrate such as a chip-on-film (COF) 6.

Figure 2:
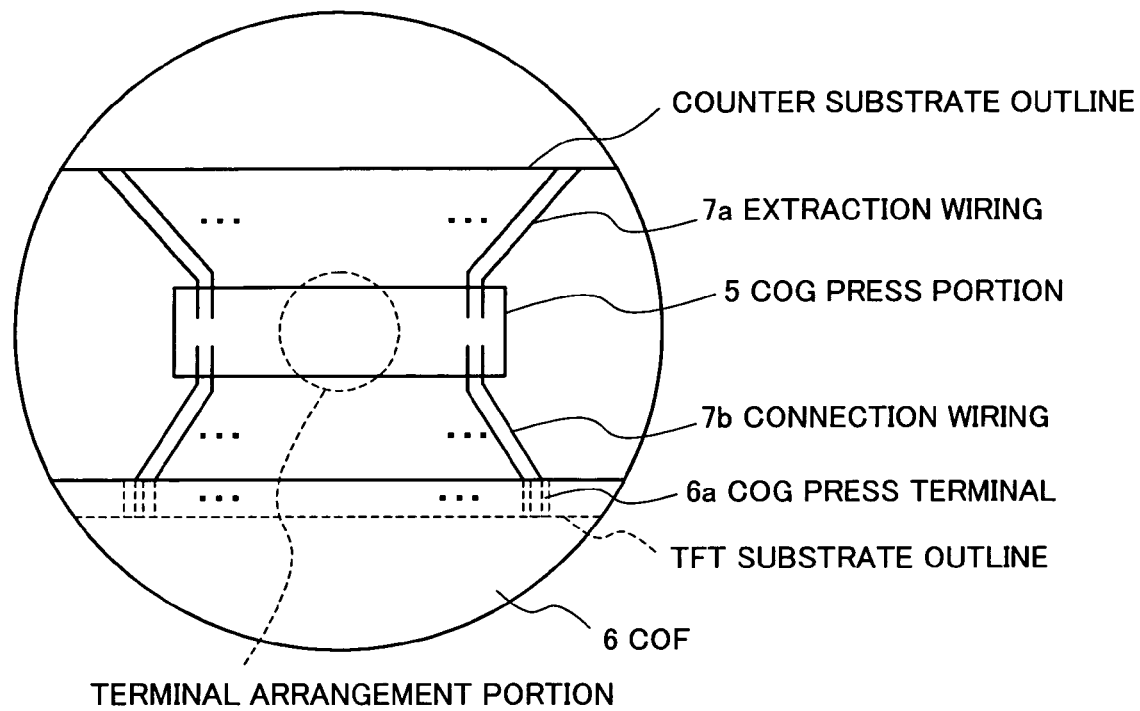
FIG. 2 is an enlarged plan view showing a peripheral region of a TFT substrate shown in FIG. 1.
Figure 3:
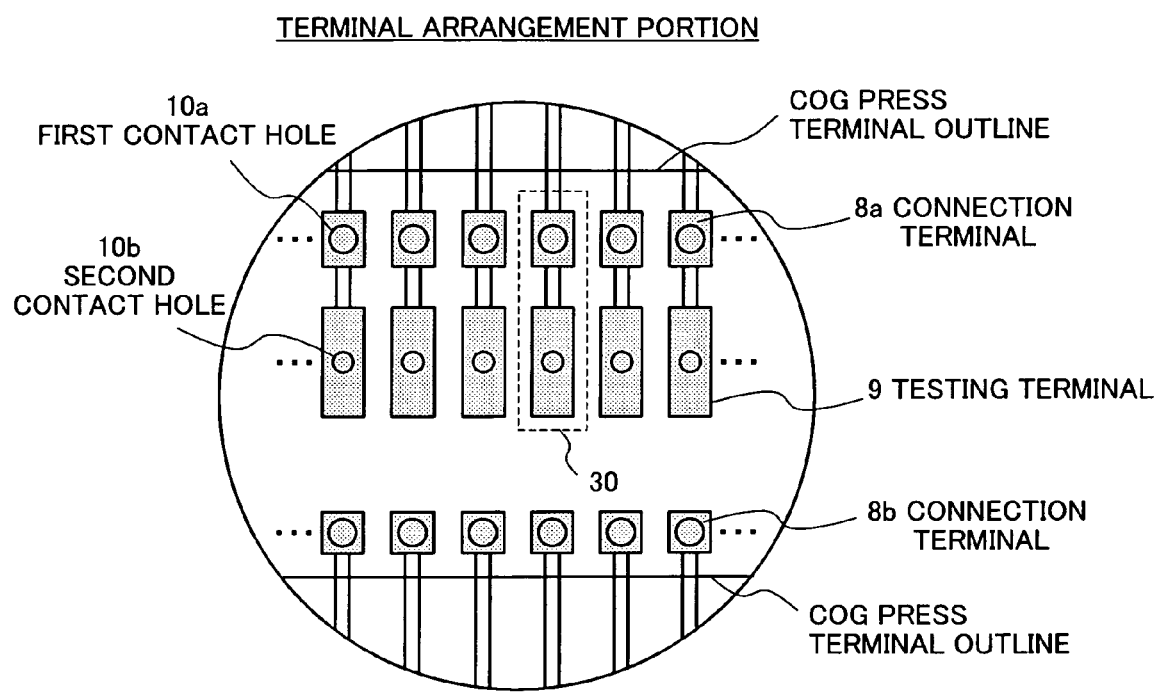
FIG. 3 is an enlarged plan view showing a terminal configuration portion shown in FIG. 2.

As shown in FIG. 2 (enlarged view showing a peripheral region of the TFT substrate shown in FIG. 1) and FIG. 3 (enlarged view showing a terminal arrangement portion shown in FIG. 2), the scanning lines and the signal lines are connected with extraction wirings 7a in the terminal area 4c. A connection terminal 8a which is connected with a COG chip through a bump and a testing terminal 9 for making contact with a probe of a prober to perform a test are provided in each of the COG press portions 5 which is located in an end portion of each of the extraction wirings 7a. Connection wirings 7b for connecting the COG chip with the COF 6 are formed on extensions of the extraction wirings 7a. A connection terminal 8b is formed in one of ends of each of the connection wirings 7b and a terminal connected with a COG press terminal 6a (not shown) is formed in the other end thereof.

Figure 4A:
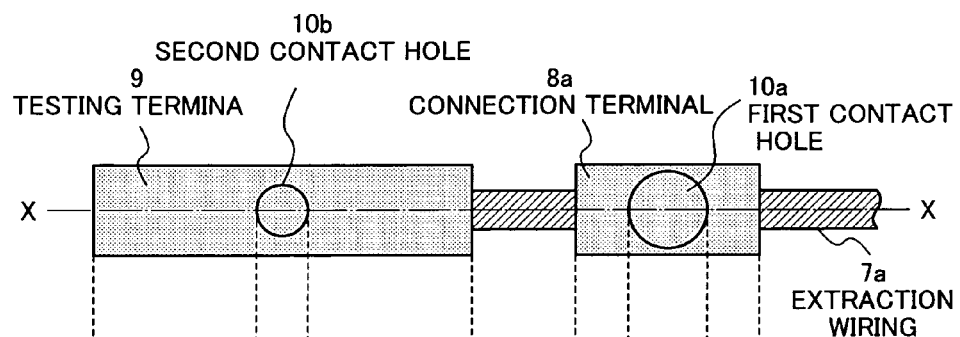
FIG. 4A is a plan view showing a structure including terminals and contact holes on the TFT substrate in the exemplary embodiment of the present invention.
Figure 4B:
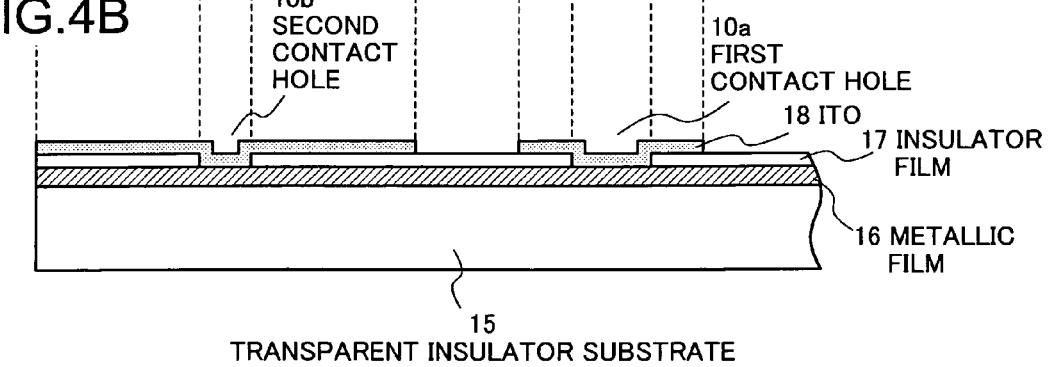
FIG. 4B is a cross sectional view showing an X-X line cross section shown in FIG. 4A.

As shown in FIGS. 4A and 4B (enlarged views showing a portion surrounded by a broken line 30 shown in FIG. 3), the contact terminal 8a is connected with a metallic film 16 through a first contact hole 10a formed in an insulator film 17. The testing terminal 9 is connected with the metallic film 16 through a second contact hole 10b formed in the insulator film 17.

Note that, in FIGS. 4A and 4B, the connection structure between the extraction wiring 7a (more specifically, metallic film 16) and each of the terminals is simplified to explain it simply. For example, when the extraction wiring 7a is to be formed in the same layer as a scanning line in a reverse stagger structure, a laminated film of, for example, a gate insulator film and a passivation film is used as the insulator film 17. When the extraction wiring 7a is to be formed in the same layer as a signal line, a structure in which an insulator film (i.e., gate insulator film) is interposed between a transparent insulator substrate 15 and the metallic film 16 is used for the insulator film 17. The extraction wiring 7a for the signal line may be formed in the same layer as the signal line. A structure in which the extraction wiring 7a for the signal line is formed in the same layer as the scanning line and connected with the signal line through a contact hole may be used.

Each of the transparent insulator substrate 15, the metallic film 16, and the insulator film 17 as shown in FIG. 4B has an arbitrary material, shape, thickness, or the like. For example, glass or plastic can be used for the transparent insulator substrate 15. For example, an Al film, an Mo film, a Cr film, or a laminated film of those can be used as the metallic film 16. For example, a silicon oxide film, a silicon nitride film, or a laminated film of those can be used as the insulator film 17. For example, one of various metallic films or a laminated film of those can be used instead of the ITO film 18.

Figure 9A:
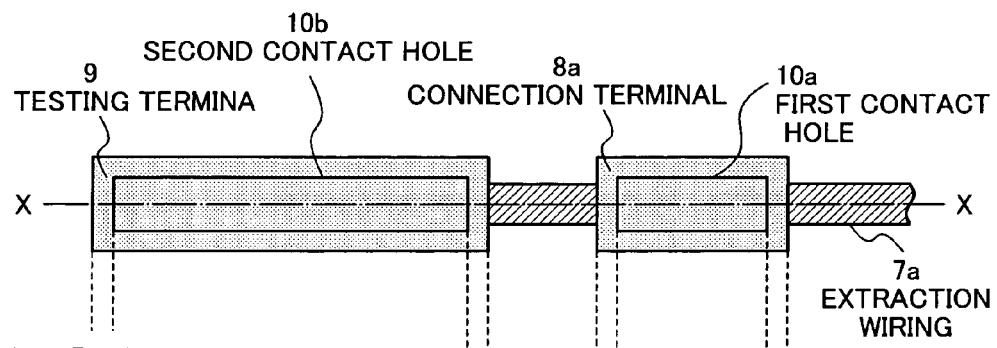
FIG. 9A is a plan view showing a conventional structure including terminals and contact holes on a TFT substrate.
Figure 9B:
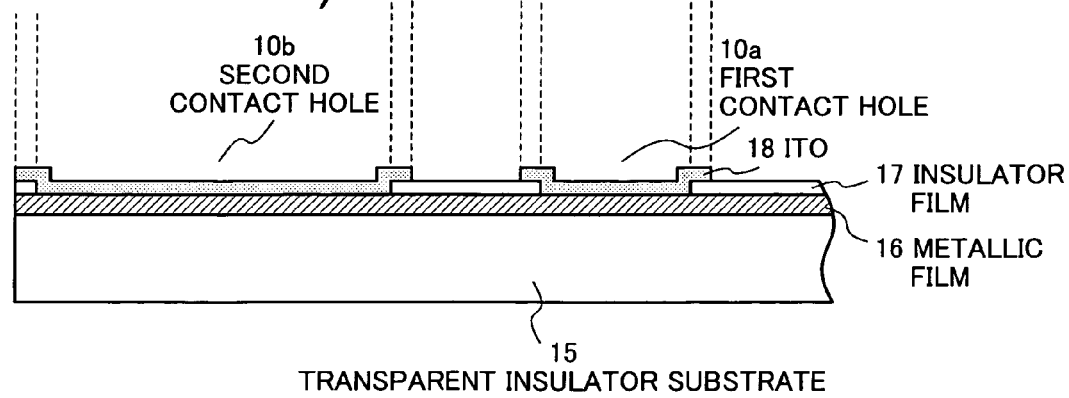
FIG. 9B is a cross sectional view showing an X-X line cross section shown in FIG. 9A.
Figure 10A:
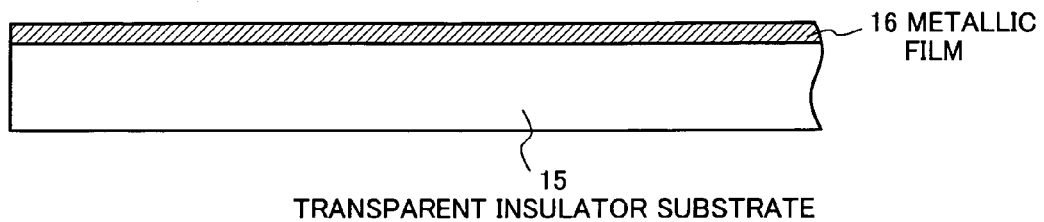
FIGS. 10A to 10C are explanatory views showing conventional steps for producing a terminal area of the TFT substrate.
Figure 10B:
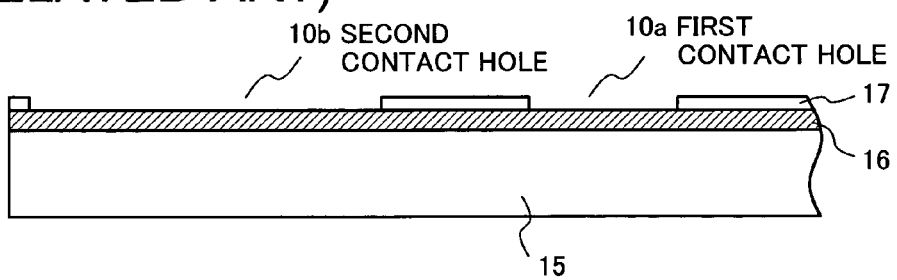
Figure 10C:
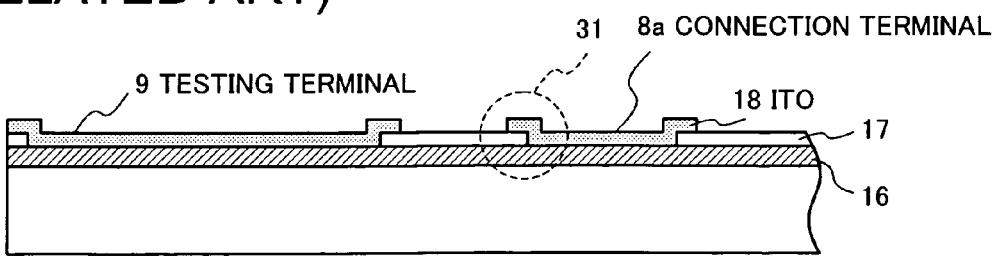

Here, the conventional TFT substrate will be described again. As shown in FIGS. 9A and 9B, the shape of the first contact hole 10a and the shape of the second contact hole 10b are similar to the shape of the connection terminal 8a and the shape of the testing terminal 9, respectively. In order to reduce a contact resistance with the metallic film 16, each of the contact holes is formed in a large size. Therefore, in the case of the structure shown in FIGS. 9A and 9B, it is likely to cause the gap 19a or 19b near the opening end of the contact hole (in particular, the second contact hole 10b), so that the extraction wiring 7a maybe corroded. In addition, in the structure shown in FIGS. 9A and 9B, the testing terminal 9 requires some size to make contact with a probe of a prober. Therefore, it is necessary that the testing terminal 9 have a size larger than the connection terminal 8a. When each of the contact holes is formed in a shape similar to a corresponding terminal, the opening area of the second contact hole 10b for the testing terminal 9 necessarily becomes larger than the opening area of the first contact hole 10a for the connection terminal 8a. As a result, there is a problem that it is likely to cause the corrosion of the extraction wiring 7a.

Figure 11A:
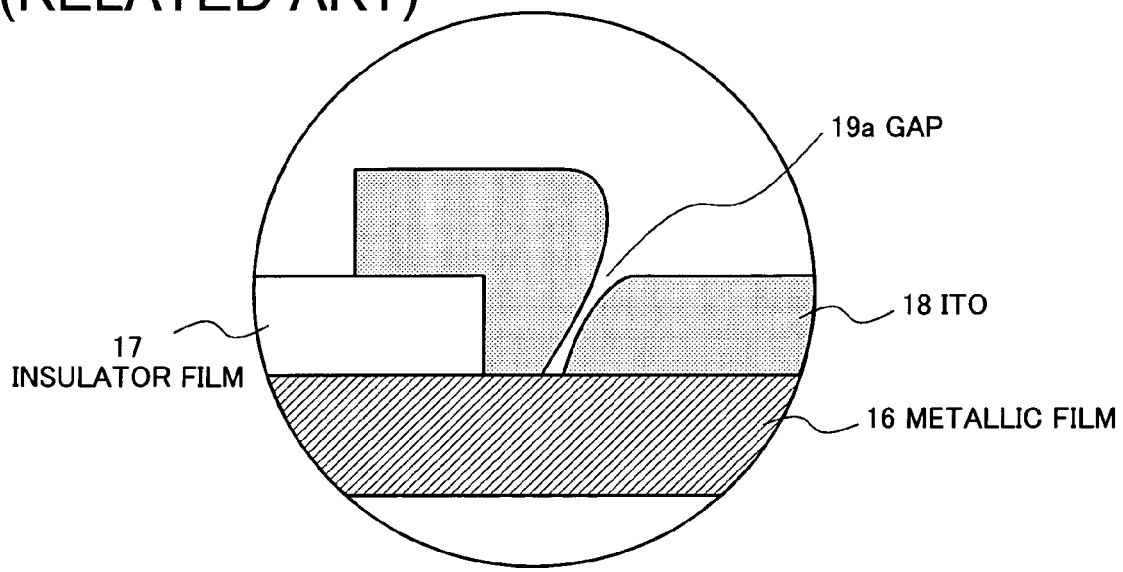
FIGS. 11A and 11B are explanatory views showing reasons why a gap is caused near an opening end of a contact hole.
Figure 11B:
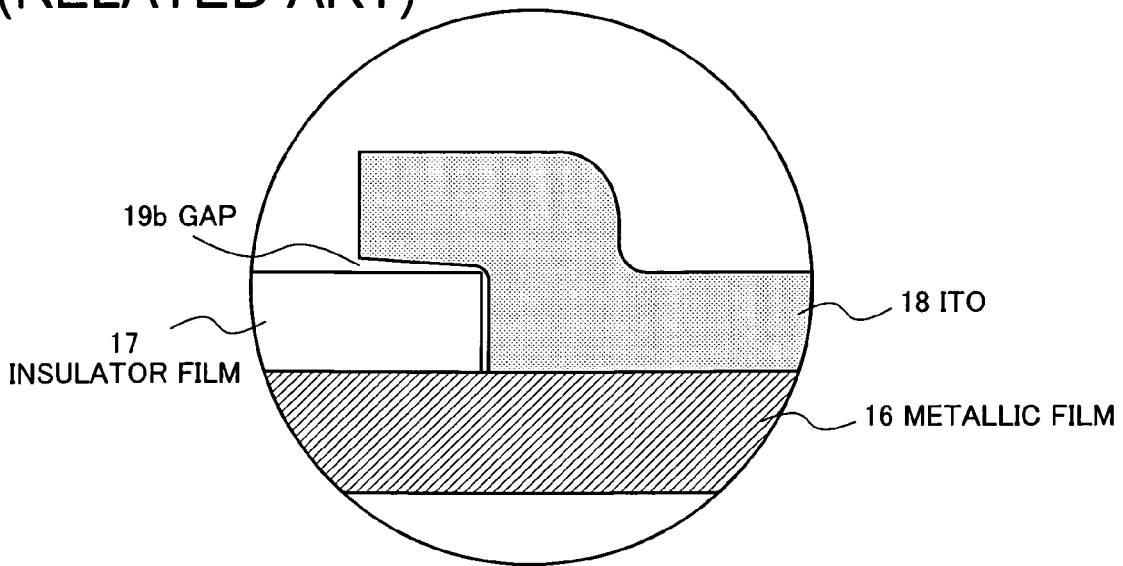

In order to suppress the generation of the corrosion, in this exemplary embodiment, a relationship between the opening area of the first contact hole 10a and the opening area of the second contact hole 10b is specified such that the corrosion caused in the second contact hole 10b for the testing terminal 9 can be effectively suppressed. To be specific, even when the area of the testing terminal 9 is larger than the area of the connection terminal 8a as shown in FIGS. 4A and 4B, the opening area of the second contact hole 10b is set to be smaller than the opening area of the first contact hole 10a for the connection terminal 8a. This prevents the generation of the gap 19a near the opening end of the second contact hole 10b. Therefore, in this exemplary embodiment, the corrosion of the extraction wiring 7a is effectively suppressed. When the area of the contact hole narrows, a distance between an end portion of the terminal and the contact hole becomes longer. Thus, it is also possible to suppress the generation of the gap 19b through which the surface of the metallic film 16 is exposed to external air as shown in FIG. 11B.

Figure 5:
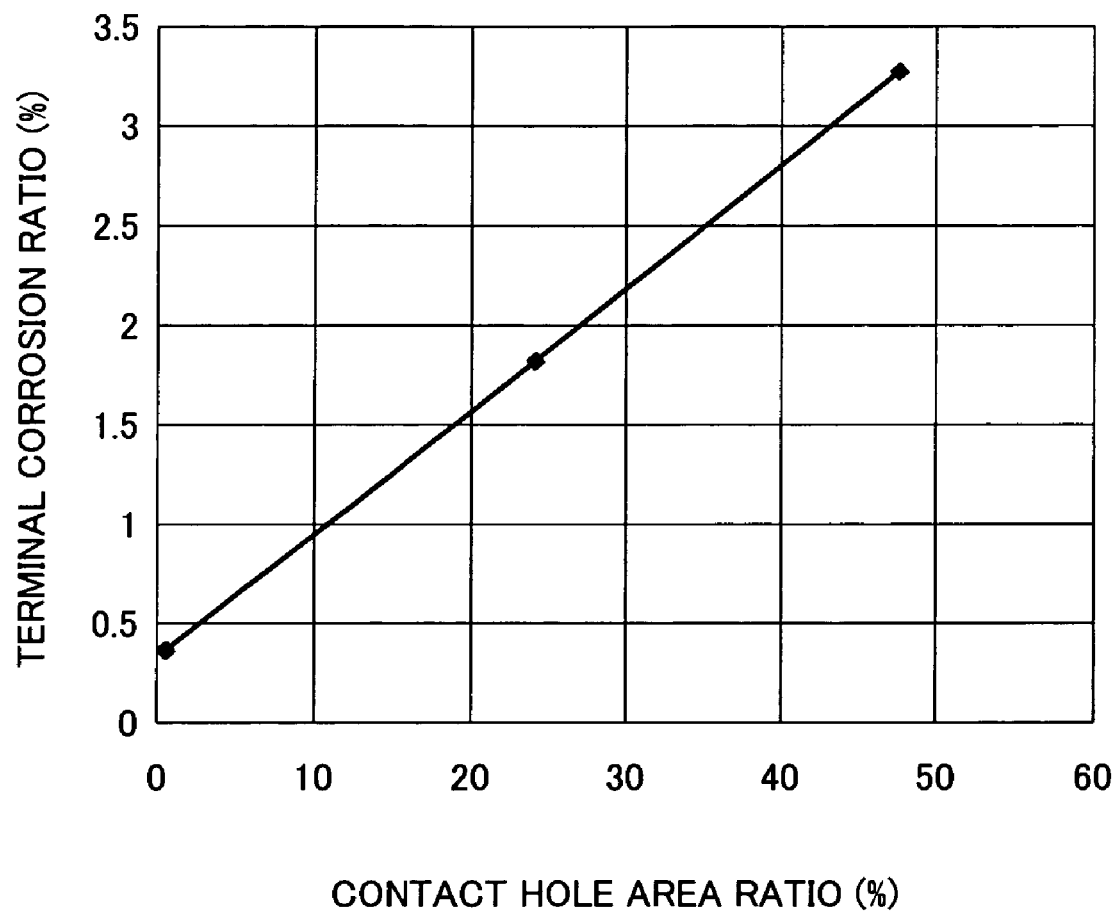
FIG. 5 is a graph showing a result obtained by measurement on a relationship between a contact hole area ratio and a terminal corrosion ratio in the TFT substrate in the exemplary embodiment of the present invention.

FIG. 5 shows a result obtained by experiment performed to determine a corrosion suppressing effect caused by a reduction in opening area of the contact hole. In this experiment, samples in which contact holes having different opening areas are formed are prepared. The respective samples are held for 100 hours in an atmosphere in which temperature is 85° C. and humidity is 85%, and then terminal corrosion ratios of the respective samples are measured. In FIG. 5, the abscissa indicates a contact hole area ratio (that is, a ratio of the opening area of the contact hole to the area of the terminal (%)) and the ordinate indicates a terminal corrosion ratio (that is, a ratio of the number of terminals in which the metallic film 16 is corroded, to the total number of terminals).

FIG. 5 shows the following fact. In a sample in which an area ratio between the terminal and the contact hole is substantially 48% (with the structure as shown in FIG. 9B), the metallic film 16 for each of 16 terminals out of 480 terminals is corroded. That is, the terminal corrosion ratio in the conventional structure is substantially 3.3%. In contrast to this, in a sample in which the area ratio between the terminal and the contact hole is substantially 0.5% (with the structure in this exemplary embodiment as shown in FIGS. 4A and 4B), 5 terminals out of 1440 terminals are corroded. Therefore, in this exemplary embodiment, the terminal corrosion ratio is substantially 0.3%. This fact suggests that the corrosion of the extraction wiring can be suppressed by a reduction in area ratio between the terminal and the contact hole. Although it is preferable that the terminal corrosion ratio be minimum, the terminal corrosion ratio which is equal to or smaller than 1% is acceptable. Thus, when the area ratio between the terminal and the contact hole is set to be substantially equal to or smaller than 10%, the terminal corrosion ratio is within an acceptable range.

As described above, when the opening area of the second contact hole 10b is set to be smaller than the opening area of the first contact hole 10a, the corrosion of the extraction wiring 7a is effectively suppressed. On the other hand, when the opening area of the contact hole narrows, a contact resistance between the extraction wiring 7a and the terminal becomes larger. Therefore, it is preferable to set a lower limit of the opening area of the contact hole (in particular, the second contact hole 10b) based on an acceptable contact resistance value. That is, it is also preferable to specify the lower limit of the opening area of the contact hole. An upper limit of the contact resistance value is changed according to a resistance value of another portion (for example, a resistance of the extraction wiring 7a or a resistance between the probe of the prober and the terminal). The inventor of the present invention determines that there is no problem in the operation of the liquid crystal display device in the case where the contact resistance value is substantially equal to or smaller than 100 Ω. Thus, the lower limit of the opening area can be specified from experiment such that the contact resistance becomes equal to or smaller than 100 Ω. According to the experiment made by the inventor of the present invention, when the contact resistance is set to be equal to or smaller than 100 Ω, the lower limit of the opening area of the second contact hole becomes approximately 15 μm².

Figure 6:
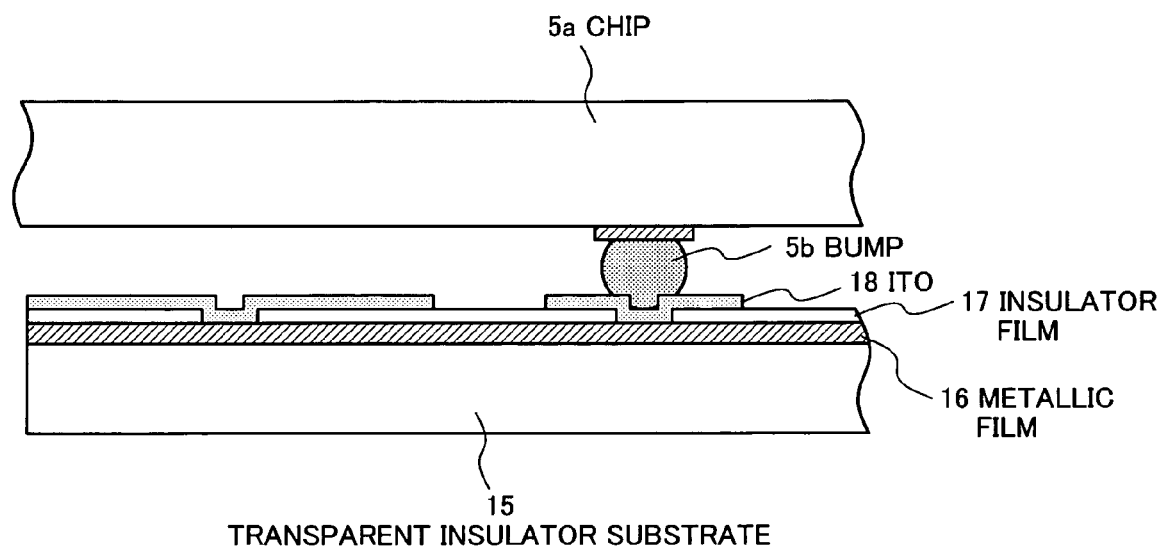
FIG. 6 shows a state in which a COG chip is mounted on the TFT substrate in the exemplary embodiment of the present invention.

FIG. 6 shows a state in which a COG chip 5a is mounted on the TFT substrate. In this state, the opening of the first contact hole 10a is covered with a bump 5b for connecting the COG chip 5a with the ITO film located in the first contact hole. Therefore, even when the gap 19a is caused near the opening end of the first contact hole 10a, the bump 5b prevents the extraction wiring 7a from exposing. However, when the first contact hole 10a is not completely filled with the bump 5b, the extraction wiring 7a may be exposed in a portion of the first contact hole 10a. Thus, it is preferable to set an upper limit of the opening area of the first contact hole 10a such that the upper limit becomes smaller than a cross sectional area of the bump 5b of the COG chip 5a in a radius direction thereof.

In the related arts as shown in FIG. 9B etc., only a reduction in contact resistance between the extraction terminal 7a and the terminal is expected. Therefore, the contact hole is formed in the rectangular shape similar to the terminal to increase the area of the contact hole.

In order to reduce the gap 19a caused near the opening end of the contact hole, it is preferable to minimize the circumference length of the contact hole. It is expected that the contact hole has corners on which the ITO film 18 cannot be easily deposited and thus the gap 19a is easily caused near the corners. Therefore, it is preferable to form each of the first contact hole 10a and the second contact hole 10b in a circular shape such that the area thereof is equal to that in the case of the rectangular shape and the circumference length thereof becomes shorter than that in the case of the rectangular shape.

However, the shape of the contact hole is not limited to only the circular shape. It is only necessary that the contact hole, at least the second contact hole for the testing terminal have a shape with smaller circumference length and the hole shape has not a corner.

Figure 7A:
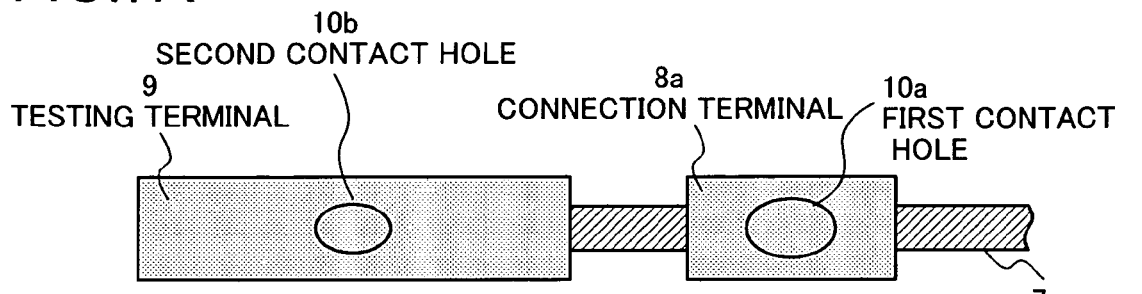
FIG. 7A is a plane view showing an example of a contact hole structure for the TFT substrate in an exemplary embodiment of the present invention.

For example, FIG. 7A shows an example in which each of the first contact hole and the second contact hole is formed in an elliptical shape. A shape in which the corners of the rectangular shape are rounded can be also employed.

Figure 7B:
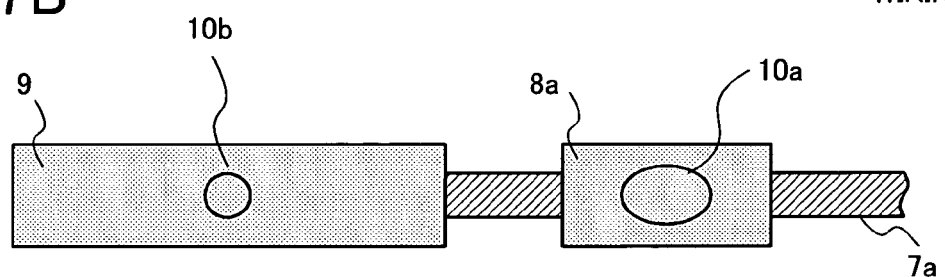
FIG. 7B is a plane view showing another example of a contact hole structure for the TFT substrate in an exemplary embodiment of the present invention.

The shape of the first contact hole 10*a* and the shape of the second contact hole 10*b* are not necessarily identical to each other. For example, FIG. 7B shows an example in which the first contact hole 10*a* is formed in an elliptical shape and the second contact hole 10*b* is formed in a circular shape. The first contact hole 10*a* is pressed to the bump 5*b* of the COG chip 5*a*, so the shape thereof may be changed corresponding to the bump 5*b*.

Figure 7C:
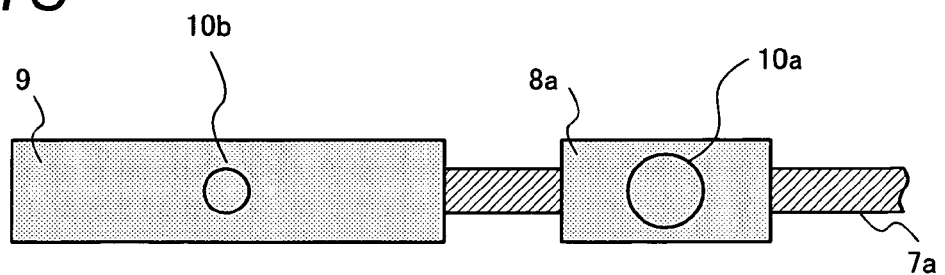
FIG. 7C is a plane view showing another example of a contact hole structure for the TFT substrate in an exemplary embodiment of the present invention.

In the related arts described with reference to FIG. 9B and so on, the large contact hole shape is employed in view of only a reduction in contact resistance between the extraction wiring 7*a* and the terminal. Therefore, it is necessary to locate the contact hole substantially in the center of the terminal in the related art. According to the present invention, the area of the contact hole is small, a designer can freely determine a contact hole position. In particular, in the case of the second contact hole 10*b* for the testing terminal 9, it is more likely to cause the gap near the opening end thereof by making contact with the probe of the prober. FIG. 7C shows an example in which the second contact hole 10*b* is provided in an end portion of the testing terminal 9. A tester brings the probe into contact with a center portion of the testing terminal 9 in many normal cases. Therefore, a damage to the contact hole can be prevented during testing by the configuration shown in FIG. 7C.

Figure 7D:
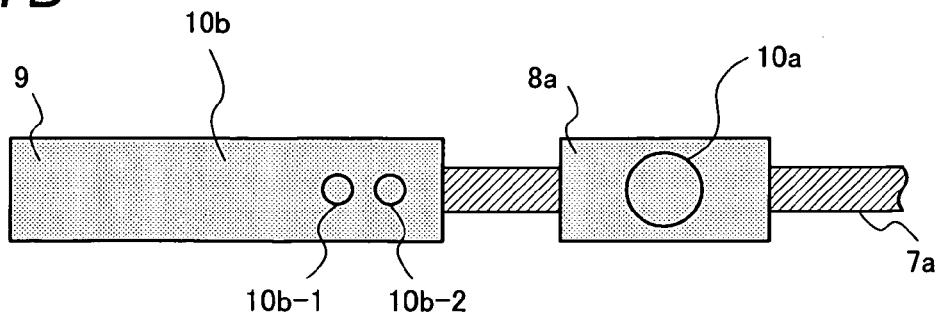
FIG. 7D is a plane view showing another example of a contact hole structure for the TFT substrate in an exemplary embodiment of the present invention.
Figure 8:
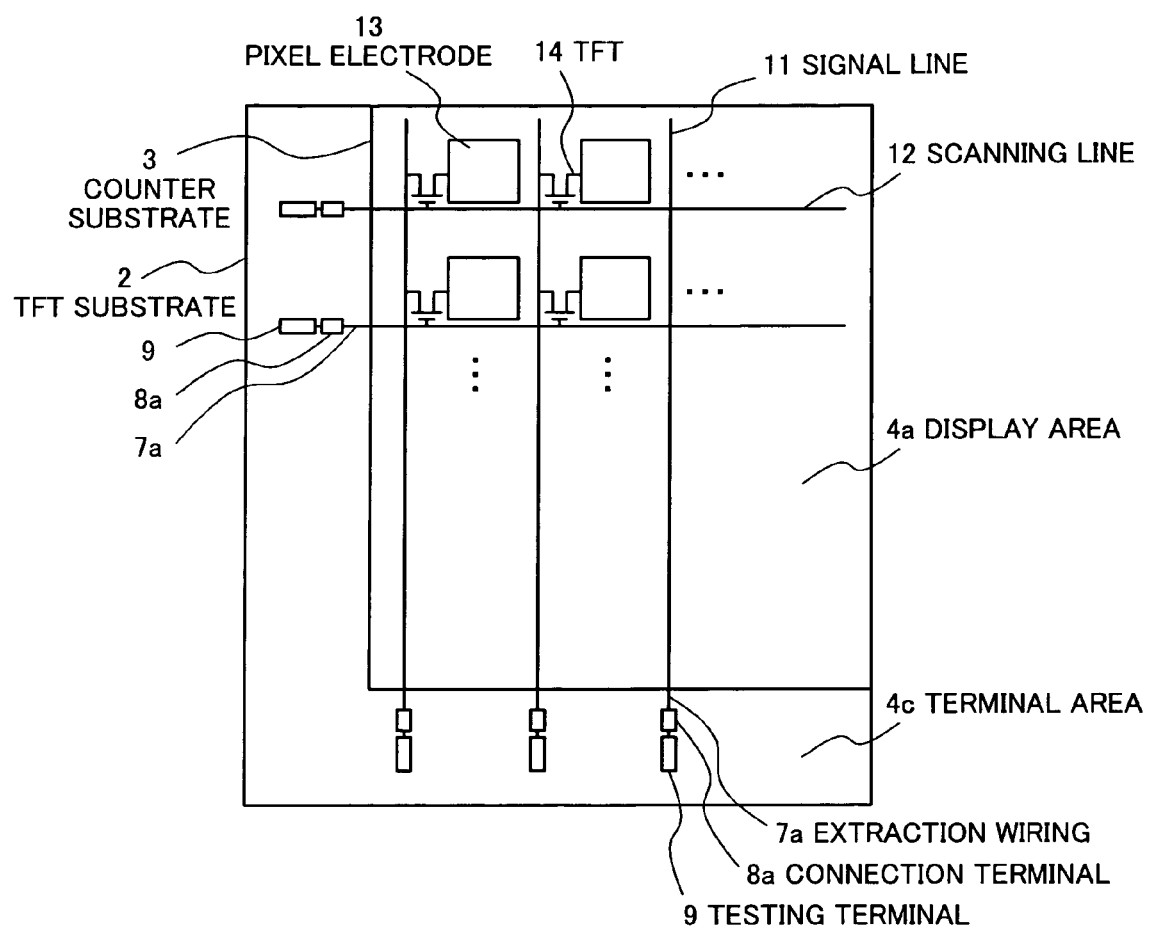
FIG. 8 shows a general structural example of a liquid crystal display device.

FIG. 7D shows an example in which two second contact holes 10*b*-1 and 10*b*-2, each of which has a small circular shape, are provided in each testing terminal. In this example, a plurality of contact holes are provided in a testing terminal. Therefore, there is an additional merit that a resistance between the contact hole and the testing terminal is reduced.

As described above, in these exemplary embodiments, the opening area of the second contact hole 10*b* is specified to become smaller than the opening area of the first contact hole 10*a* even when the area of the testing terminal 9 is larger than the area of the connection terminal 8*a*. As described above, it is preferable that at least the second contact hole 10*b* have the shape in which the area thereof is equal to that in the case of at least the rectangular shape and the circumference length thereof becomes shorter than that in the case of the rectangular shape. It is most preferable that the second contact hole 10*b* have the circular shape.

In a part of these exemplary embodiments, the lower limit of the area of the second contact hole 10*b* is specified such that the contact resistance with the extraction wiring 7*a* becomes smaller than a predetermined value (for example, 100Ω). When this condition cannot be satisfied in the case of only a single contact hole, a plurality of small contact holes are provided in a terminal. Therefore, the above-mentioned condition can be easily satisfied by the embodiment of FIG. 7D.

When the second contact hole 10*b* is located in the position away from the contact area with the probe (preferably a peripheral portion of the testing terminal), the corrosion of the extraction wiring 7*a* resulting from the presence of the gap caused near the opening end of the contact hole is effectively suppressed. As a result, the reliability of the liquid crystal display device can be further improved.

The structure in the present invention is not necessarily applied to each of the terminals located in the terminal area 4*c* of the TFT substrate 2 in the same manner. For example, when a size of a terminal on the extraction wiring 7*a* located on the scanning line side is different from that on the extraction wiring 7*a* located on the signal line side, the structure in the present invention may be applied to only a terminal whose size is small. A structure in which a contact hole area, a contact hole shape, and a contact hole configuration with respect to the extraction terminal 7*a* located on the scanning line side are different from those with respect to the extraction terminal 7*a* located on the signal line side may be employed.

Each of the above-mentioned exemplary embodiments shows the case where the connection terminal 8*a* and the testing terminal 9 are arranged in this order from the display area 4*a* side. However, the present invention can be clearly applied to the case where the testing terminal 9 is located on the display area side in the same manner. In each of the above-mentioned exemplary embodiments, the structure in the present invention is applied to the first contact hole 10*a* located on the connection terminal 8*a* and the second contact hole 10*b* located on the testing terminal 9 in the TFT substrate. However, the present invention is not limited to the above-mentioned exemplary embodiments and thus can be applied to contact holes on plural kinds of terminals whose influences of corrosion are different from one another.

The present invention can be applied to a liquid crystal display device of an arbitrary type such as an in-plane switching (IPS) type or a twisted nematic (TN) type. In addition, the present invention can be clearly applied to a TFT having any of a reverse stagger (i.e., bottom gate) structure and a positive stagger (i.e., top gate) structure.

The examples, in each of which the present invention is applied to the active matrix substrate for the liquid crystal display device, are described above. However, the present invention is not limited to the active matrix substrate. Therefore, it will be understood by the skilled person that the present invention can be applied to an arbitrary substrate in which two kinds of terminals connected with an extraction wiring through contact holes are arranged in a peripheral region of the substrate.

While this invention has been described in connection with certain exemplary embodiments, it is to be understood that the subject matter encompassed by way of this invention is not be limited to those specific embodiments. On the contrary, it is intended for the subject matter of the invention to include all alternatives, modifications and equivalents as can be included with the sprit and scope of the following claims. Further, the inventor's intent is to retain all equivalents even if the claims are amended during prosecution.

What is claimed is:

1. An active matrix substrate, comprising:
a display area in which first wirings and second wirings which are substantially orthogonal to one another are formed and a switching device is formed in each of pixels surrounded by the first wirings and the second wirings; and
a terminal area which is provided outside the display area and includes a plurality of extraction wirings each connected with one of the first wirings and the second wirings, an insulator film formed on the extraction wirings, a first terminal provided on the insulator film, for connecting an extraction wiring with a chip mounted on the terminal area, a second terminal provided on the insulator film, for bringing the extraction wiring into contact with a probe of a prober, a first contact hole provided in the insulator film, for connecting the extraction wiring with the first terminal, and a second contact hole provided in the insulator film, for connecting an extraction wiring with the second terminal, wherein the second terminal has an area larger than the first terminal and an opening area of the second contact hole is smaller than an opening area of the first contact hole.

2. An active matrix substrate according to claim 1, wherein a ratio of the opening area of the second contact hole to an area of the second terminal is specified to be substantially equal to or smaller than 10%.

3. An active matrix substrate according to claim 1, wherein the opening area of the second contact hole is specified such that a contact resistance between the extraction wiring and the second terminal is equal to or smaller than a predetermined value.

4. An active matrix substrate according to claim 1, wherein the opening area of the first contact hole is specified to be equal to or smaller than a cross sectional area in a radius direction of a bump of the chip connected with the first terminal.

5. An active matrix substrate according to claim 1, wherein the second contact hole comprises at least an opening portion having a specific shape in which a circumference length of the opening portion is shorter than a circumference length of an opening portion which has a rectangular shape and whose area is equal to an area of the opening portion having the specific shape.

6. An active matrix substrate according to claim 5, wherein the specific shape is one of circular shape and an elliptical shape.

7. An active matrix substrate according to claim 5, wherein the specific shape has at least a rounded corner.

8. An active matrix substrate according to claim 1, wherein the second contact hole is located away from a contact area with the probe of the prober as viewed from a normal to the active matrix substrate.

9. An active matrix substrate according to claim 8, wherein the second contact hole is deviated from a center of the second terminal.

10. An active matrix substrate according to claim 1, wherein the second contact hole comprises a plurality of second contact holes provided on the second terminal.

11. A liquid crystal display device, comprising a liquid crystal panel including an active matrix substrate, a counter substrate, and a liquid crystal layer sandwiched therebetween, wherein the active matrix substrate includes:

a display area in which first wirings and second wirings which are substantially orthogonal to one another are formed and a switching device is formed in each of pixels surrounded by the first wirings and the second wirings; and a terminal area which is provided outside the display area and includes a plurality of extraction wirings connected with the first wirings and the second wirings, an insulator film formed on the extraction wirings, a first terminal provided on the insulator film, for connecting an extraction wiring with a chip mounted on the terminal area, a second terminal provided on the insulator film, for bringing the extraction wiring into contact with a probe of a prober, a first contact hole provided in the insulator film, for connecting the extraction wiring with the first terminal, and a second contact hole provided in the insulator film, for connecting an extraction wiring with the second terminal, and wherein the second terminal has an area larger than the first terminal and an opening area of the second contact hole is smaller than an opening area of the first contact hole.

12. A liquid crystal display device according to claim 11, wherein a ratio of the opening area of the second contact hole to an area of the second terminal is specified to be substantially equal to or smaller than 10%.

13. A liquid crystal display device according to claim 11, wherein the opening area of the second contact hole is specified such that a contact resistance between the extraction wiring and the second terminal is equal to or smaller than a predetermined value.

14. A liquid crystal display device according to claim 11, wherein the opening area of the first contact hole is specified to be equal to or smaller than a cross sectional area in a radius direction of a bump of the chip connected with the first terminal.

15. A liquid crystal display device according to claim 11, wherein the second contact hole comprises at least an opening portion having a specific shape in which a circumference length of the opening portion is shorter than a circumference length of an opening portion which has a rectangular shape and whose area is equal to an area of the opening portion having the specific shape.

16. A liquid crystal display device according to claim 15, wherein the specific shape comprises one of circular shape and an elliptical shape.

17. A liquid crystal display device according to claim 15, wherein the specific shape has at least a rounded corner.

18. A liquid crystal display device according to claim 11, wherein the second contact hole is located away from a contact area with the probe of the prober as viewed from a normal to the active matrix substrate.

19. A liquid crystal display device according to claim 18, wherein the second contact hole is deviated from a center of the second terminal.

20. A liquid crystal display device according to claim 11, wherein the second contact hole comprises a plurality of second contact holes provided on the second terminal.

* * * * *

UNITED STATES PATENT AND TRADEMARK OFFICE
CERTIFICATE OF CORRECTION

| | | |
|---|---|---|
| PATENT NO. | : 7,652,741 B2 | Page 1 of 1 |
| APPLICATION NO. | : 11/541662 | |
| DATED | : January 26, 2010 | |
| INVENTOR(S) | : Kenji Yoshioka | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 658 days.

Signed and Sealed this

Twenty-eighth Day of December, 2010

David J. Kappos
*Director of the United States Patent and Trademark Office*